INVENTOR.
Jacob Rabinow
BY Joseph A. Genovese
Max L. Libman
ATTORNEYS

Nov. 17, 1964 J. RABINOW 3,157,777

INDEXING MOVER FOR SHEETS

Filed May 23, 1961 2 Sheets-Sheet 2

INVENTOR
Jacob Rabinow
BY Joseph A. Genovese & Max L. Libman
ATTORNEYS

United States Patent Office 3,157,777
Patented Nov. 17, 1964

3,157,777
INDEXING MOVER FOR SHEETS

Jacob Rabinow, Takoma Park, Md., assignor, by mesne assignments, to Control Data Corporation, Minneapolis, Minn., a corporation of Minnesota Filed May 23, 1961, Ser. No. 112,019
17 Claims. (Cl. 235—61.11)

This invention relates to flexible sheet moving mechanisms and particularly to special purpose document moving devices.

The development of high-speed computers has triggered a chain-reaction for improved equipment to be used in connection with computers. For example, computers are capable of assimilating data at a much greater rate than ordinary input devices such as manual keyboards, punched cards, etc., can supply. Character recognition machines, particularly optical machines, are capable of recognizing characters at enormous rates. Thus, to satisfy the useful speed capabilities of computers, printed or type-written documents may be optically read by machine at speeds which are far in excess of earlier computer input techniques. The electronic circuits of character recognition machines are exceedingly fast. In fact, machines including those which I have helped to construct, for instance in accordance with my prior Patent No. 2,933,246, are capable of recognizing characters at a much greater rate than permitted by the available document feed devices. This generated a requirement for faster document feeders and stackers.

Accordingly, an object of my invention is to provide a document handling apparatus which satisfies the high-speed requirements of reading machines.

One of the greatest difficulties in the document-handling problem is accelerating a document from a rest position, or practically a rest position, to a high, synchronous speed at the reading station, and then removing the sheet from the station and stacking it. In terms of one type of scanning, to which my invention is not restricted, assume that the document is placed on a drum, and that drum is rotated to provide one component of the two components of motion necessary for scanning. One way to rotate the document would be to stop the drum, place the document on it, and then rotate the drum to synchronous speed. This is highly impractical because of the time required to stop and start the drum. An improvement on this basic system is described in Patent No. 3,069,494 where a drum is rotated continuously at synchronous speed and the documents are sequentially fed to this drum while it is in motion. This is very difficult because the documents have to be fed to the drum in close, rapid succession. Further, other problems are introduced in assuring that each document is precisely placed on the drum, otherwise the printed characters on the document will not be registered properly for scanning as the scanning head moves to generate one of the components of scan motion.

The concept of my invention is to handle more than one document simultaneously, even though only one of the plurality is at the scanning station at a given interval. One practical arrangement, for example, is to have four drums connected to a support and to index (or rotate), the support to present successive drums to successive stations, one of which is a reading station. The result is that I have four times as much time to completely handle the document as I would have in the system disclosed in Patent No. 3,069,494. To demonstrate the principle of my invention I have elected to show the details of a four-station device and a schematic of a two-station version, but it will be immediately evident that any number of stations may be selected. When four stations are used I prefer to have one station represent the document feed station to which a document is fed and connected with a first rotating drum. Meanwhile the drums at the other three stations are performing the following respective functions (*a*) accelerating another drum to synchonous speed, (*b*) rotating a third drum at synchronous speed in the reading station (*c*) discharging a document from a drum to a paper stacker at the document discharge station. All four of the drums are indexed in unison so that the same precedure is repeated at each station.

Therefore, another object of the invention is to provide a document handling machine providing for a much improved document handling procedure when the documents must be handled at high rates.

Other objects and features will become apparent in following the description of the illustrated form of the invention.

In the accompanying drawings I have shown a mover for flexible sheets (e.g. paper) and electrical means for rotating the four vacuum drums of the mover. I have selected the electrical means merely to show the principles of the invention. It is to be understood that my invention may be practiced by using other means for rotating the drums, for instance belt and/or chain drives may be substituted for the electric motors which individually rotate the drums. The analogy between electrical operation and mechanical operation will be discussed later in more detail.

Figures 1, 2, 7:
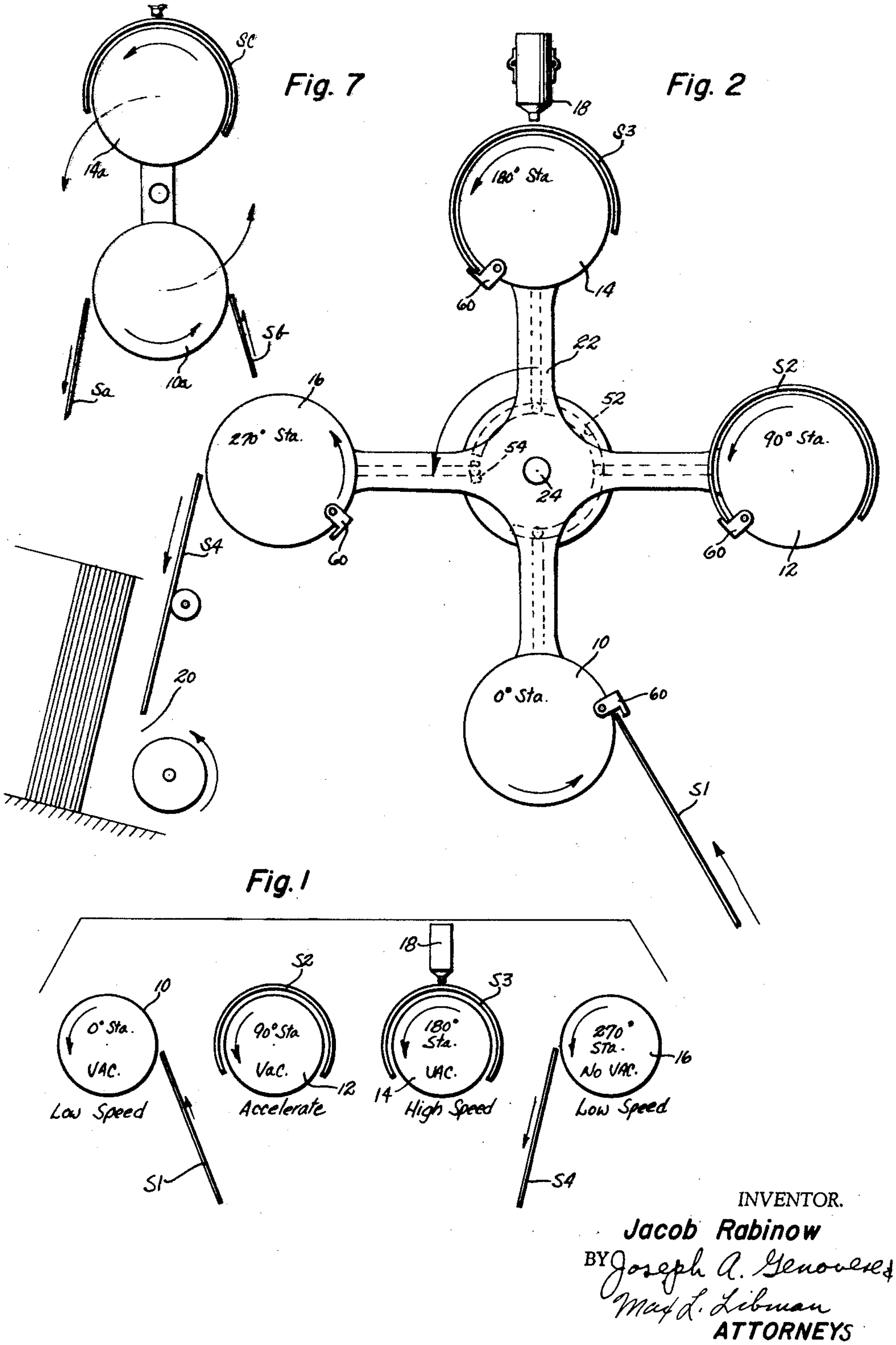
FIGURE 1 is a diagrammatic view showing the functions that are performed at the several stations of my sheet mover.
FIGURE 2 is a diagrammatic front elevational view showing the arrangement of the stations and the sheet mover in operation.
FIGURE 7 is a schematic view showing a modification.

The philosophy of the invention is best understood by referring first to FIGURES 1 and 2. FIGURE 1 shows sheet S1 being moved toward drum 10 while the drum is rotating at low speed (or standing still, if desired). The drum 10 is at the sheet receiving station, otherwise identified as the zero degree station. Any conventional paper mover may be used for directing the sheet toward drum 10. After sheet S1 is attached to drum 10 by means which shall be described subsequently, drum 10 is moved to the second or 90° station. During this movement and/or at the 90° station, the drum 10 is accelerated to high, e.g. synchronous, speed. Sheet S2 at the 90° station is shown wrapped around the drum 12 at this acceleration station. Since there are four drums and four stations, FIGURE 1 represents what is taking place at the individual stations, involving four separate sheets, S1 and S2 which have been already described, and S3 and S4. A simplified system (FIGURE 7) having only two drums is described later.

At the 180° or reading station, the drum 14 has already reached synchronous speed. The vacuum remains applied to drum 14 to hold the sheet S3 adhered to the surface of the drum. Reading head 18 is shown diagrammatically above sheet S3. The reading head moves in a direction parallel to the axis of rotation of the drum by a mechanism which forms no part of my present invention. However, it may be mentioned that the purpose of the reading head is to scan the information on the surface of sheet S3 while the sheet is at the reading station.

At the fourth station, i.e. the 270° or sheet discharge station, sheet S4 is released from the drum. Drum 16 at the 270° station may operate at a speed slower than synchronous speed for ease of handling sheet S4 as it is discharged and fed into a stacker 20 (FIGURE 2) of any conventional design.

Referring particularly to FIGURE 2, the four drums 10, 12, 14 and 16 are shown supported at the ends of support 22 having four radial arms, one for each drum. Support 22 is attached to shaft 24, and a conventional indexer 26 (FIGURE 3) is secured to the shaft. The indexer is preferably a commercially available electric stepping motor which is either designed or adjusted to index support 22 90° per step.

Figures 3, 4, 5, 6:
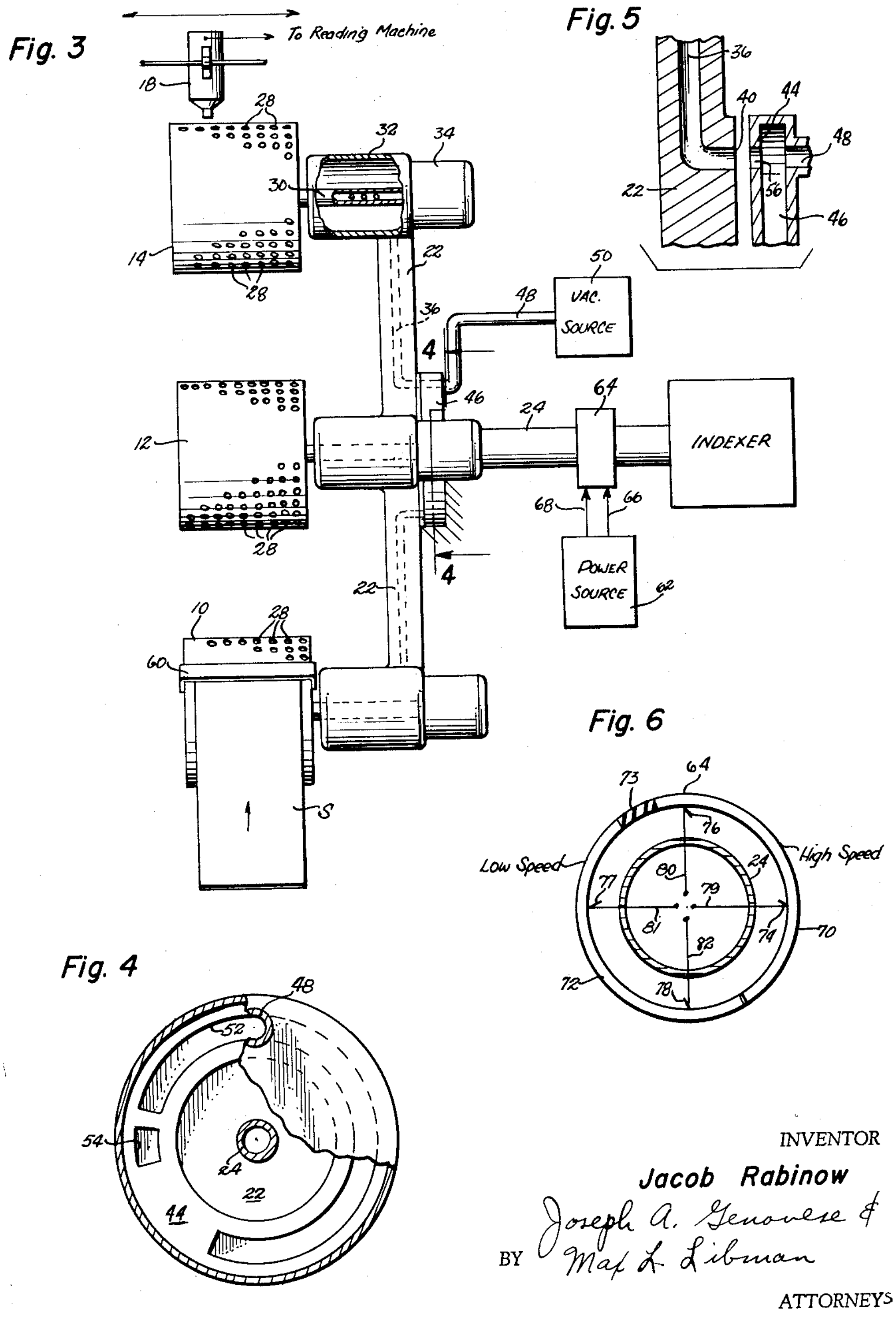
FIGURE 3 is a partially side elevational and partially diagrammatic view of the sheet mover.
FIGURE 4 is an enlarged sectional view taken on line 4—4 of FIGURE 3 showing the means of applying vacuum drums and of venting the drum which is at the discharge station.
FIGURE 5 is a fragmentary sectional view showing a detail of the vacuum valve in FIGURE 4.
FIGURE 6 is a schematic view showing a slip ring assembly in the circuits of the motors which drive the drums at the various stations.

Each drum is hollow and has a plurality of ports 28 in its surface, for instance see drum 14 of FIGURE 3. The drum 14 is supported on a hollow shaft 30 mounted in bearings within a casing 32 at the end of one of the radial arms of support 22. Shaft 30 is the output shaft of motor 34, there being one motor for each drum. Air passage 36 is in communication with the passage in hollow shaft 30 by registering with the hollow casing 32. The opposite end of passage 36 (see FIGURE 5) forms the port 40. Plate 44 forms one wall of a vacuum box 46 which is connected, by way of a duct 48, to a vacuum source 50 (FIGURES 3 and 5). The port 40 is in registry with an arcuate vacuum port 52 formed in valve plate 44 (FIGURE 4) during approximately 270° of rotation of support 22. When support 22 moves to such position that port 40 registers with port 54 (FIGURE 4), passage 36 and its drum 14 becomes vented to the atmosphere inasmuch as port 54 is not connected with the vacuum box 46 but is connected directly to the atmosphere or to a pressure source (if pressure is desired to aid in the removal of the sheet S3 in FIGURE 2) during the stripping of the sheet from its drum. Summarizing to this point, support 22 is indexed to bring successive drums into successive stations. Vacuum is applied to the drum at the zero degree station, the 90° station, the 180° station and remains applied to each drum until the drum reaches the 270° station. At the 270° station, the drum is vented. A new sheet S1 (FIGURE 2) is applied to the surface of drum 10 at the zero degree station. I have shown clamps 60 on all of the drums which may be used in lieu of vacuum or in combination with vacuum. The clamps require operating mechanisms so that they close and open in phase with the movement of the drum and their rotation, for example as in a commercially available "Multilith" machine (Addressograph-Multigraph Co.), or in Patent No. 2,903,260 or in numerous other prior patents disclosing drum type sheet handling mechanisms.

I have already mentioned that the drum speeds usually are different at the various stations, and these speeds are identified in FIGURE 1 by legends. Where a mechanical system is used, motors 34 are unnecessary. Instead of using motors I can use pulleys or rubber-tired wheels and provide power input belts or wheels against which the pulleys bear when support 22 is indexed.

The electrical system consists of a power source 62 and a slip ring assembly 64. The motors 34 may be two-speed motors such as, for example, synchronous motors capable of operating at different speeds. For the purpose of explanation assume that the motors are two-speed motors and that the power source 62 provides power over lines 66 and 68 to energize the motors such that they will operate at low speed and high speed respectively. A common connection, which may be the frame, is not shown. The slip ring assembly, which is diagrammatically shown in FIGURE 6, has two sections 70 and 72, the section 70 being identified as the high speed section while the section 72 is the low speed section. Brushes 74, 76, 77 and 78 are spaced 90° from each other, and the conductors 79, 80, 81 and 82 extending from the brushes, are connected to the four motors which rotate the four drums 10, 12, 14 and 16 respectively. When shaft 24 turns, the brushes 74, 76, 77 and 78 rotate therewith and successively contact the sections 70 and 72 to energize the motors at the desired speeds when they are moving to and are actually at the four stations. If desired I use an insulation section 73 between sections 70 and 72 so that as each brush passes from the high speed section 70 to the low speed section 72, there is a brief interval during which the drive windings of the motors are not energized. This would allow for an arrangement whereby a mechanical brake could be applied during this brief period, e.g. a mechanical brake normally held disengaged by the motor-operating current.

In operation of the electric motor circuits (FIGURE 6) brush 78 will energize the motor for the drum while at the zero degree station (FIGURE 2). The motor will operate at low speed when at this station. Now assume that the brush 78 moves with the entire support 22 and its shaft 24, toward the 90° station. Just after leaving the zero degree station during which the drum operates at low speed to receive a sheet S, brush 78 engages the high speed section 70 and remains in contact with this section giving the drum ample time to reach high speed from the low speed condition which prevailed when contact 78 is in the position shown in FIGURE 6. By the time that the indexer 26 has moved support 22 to the reading station, the drum will have reached high speed. Then, as the drum leaves the reading station, the brush engages the insulation section 73 to cause the brake to slow the motor and drum but not stop them. The insulation section is strictly optional and is not ordinarily essential. Section 72 could be close to section 70 so that when the brush leaves section 70 it next comes in contact with the low speed section 72. Consequently, when the discharge station is reached, the drum is operating at low speed to facilitate handling of the sheets by the stacker 20.

FIGURE 7 shows a document handling machine with two drums 10*a* and 14*a* rotatably carried by support 22*a*. The rotating means for the drums, the vacuum system, clamps (optional) and indexer may be the same as in FIGURE 2. Alternatively separate switches and/or valves may be used in this simpler form of my system. When a drum reaches one position, e.g. that occupied by drum 10*a*, it is slowed; the sheet S*a* is discharged, the drum receives a new sheet S*b*. If valving like that of FIGURE 4 is used, this will require that port 54 (FIGURE 4) be located close to the beginning of port 52 whereby sheet S*a* is discharged just before the zero degree station (drum 10*a* in FIGURE 7) and the new sheet S*b* is accepted at or slightly after the 0° station. If separate valving is used, while drum 10*a* is at the 0° station, the sheet S*c* will be at the reading station.

After sheet S*b* is attached to the surface of drum 10*a* the drum is brought up to speed and support 22*a* is indexed 180°, bringing drum 14*a* to the zero degree station, and drum 10*a* to the reading station. In traveling from the reading station to the zero degree station, the drum is decelerated or allowed to decelerate to low speed, so that while at the zero degree station, it discharges its sheet and receives another new sheet.

It is understood that various changes, alterations and modifications in addition to those mentioned herein, may be resorted to without departing from the protection of the following claims.

I claim:

1. A document handling machine comprising a support, a plurality of document-holding members carried by said support in spaced relationship to each other, means associated with each member to hold a document on each member, means for moving said support to serially displace said members to successive stations, means to rotate said members so that the documents thereon are correspondingly rotated, one of said stations being a document-feed station at which a document is fed to one member, and another of said stations being a scanning station at which a document on another of the members is scanned at substantially the same time that the document is being fed to said one member.

2. The machine of claim 1 wherein said means to rotate said members include means to increase the speed thereof upon leaving said document-feed station.

3. A document handling machine having stations including a document-feed station, a scanning station and a document discharge station, a movable support, a plurality of document-holding members movable with said support, each member being successively movable from station-to-station with the movement of said support, means for rotating the member at said feed station at a comparatively low speed and at the same time for rotating the member at said scanning station at a higher speed so that the feeding of the document to the member is at a speed lower than the speed of the member during scanning.

4. In a machine for rotating a document at a high speed to enable the document to be scanned at a high rate, a support, a document-holding member connected to said support and adapted to retain a document which is fed thereto, means to move said support and the member to a document scanning station, means operative while said support and member are being moved to said scanning station for accelerating said member to a predetermined speed, and means for moving said support and member to a document-discharge station after the document has been scanned.

5. The machine of claim 4 wherein there is a second document-holding member secured to said support and adapted to receive a document while the first-mentioned document is at said scanning station whereby more than one document is handled while one is being scanned.

6. The machine of claim 5 wherein said means to move said support includes an index device drivingly connected to said support.

7. An indexing mover for flexible sheets comprising a support, a plurality of sheet-holding members, means mounting said members for rotation and in spaced relationship on said support, means to index said support to bring successive members to successive positions, means for rotating a first of said members at a first speed when at a position to receive a sheet and to increase the speed of said first member when said support is indexed to bring said first member to a second position, and meanwhile a second of said members is being moved with said support to said first position to receive another sheet.

8. An indexing mover for flexible sheets comprising a support, a plurality of sheet-holding members, means mounting said members for rotation in spaced relationship on said support, means to index said support to bring successive members to successive positions, means for rotating a first of said members at a first speed when at a position to receive a sheet and to increase the speed of said first member when said support is indexed to bring said first member to a second position, and meanwhile a second of said members is being moved with said support to said first position to receive another sheet, and the speed of said first member being reduced from the time that said first member leaves said second position and returns to said first station, and means for discharging the sheet from said first member during the time that said first member leaves said second position and returns to said first position.

9. A sheet-handling machine comprising a support, a plurality of sheet retention members carried by said support, means for rotating the members at a predetermined speed when in certain positions to facilitate loading and unloading sheets from the members, and means to rotate the members at a higher speed when the members are moved to different positions by said support.

10. For use with a reading machine which has a movable scan means providing one component of motion for scanning a document, a document handling mechanism comprising a support provided with a plurality of drums, means to index said support to bring successive drums into successive stations, one of said stations being a document loading station, another being an acceleration station, another being a reading station and another being a document discharge station, means to rotate the drum at said loading station at a first speed, means to accelerate the drums at said acceleration station to a higher speed at which the drum in said reading station is operating while in said reading station, the rotation of the drum at said reading station providing another component of scan motion, and means to rotate the drum in said discharge station at a speed lower than said higher speed to facilitate discharge of the documents from the drum and to a utilization device.

11. The subject matter of claim 10 wherein the means for holding document on the drums are pneumatic and effective while the drums are at the sheet-receiving station, the acceleration station and reading station.

12. In a flexible document-handling machine, a support, a plurality of drums carried by the support, means to move the support to bring successive drums into successive stations, one of said stations being a reading station at which the drum is rotating at a predetermined speed to provide one component of scan motion for the document on the drum, the other stations adapted to have documents being processed by the drums during the time that the document in the scanning station is being scanned to enable handling procedures regarding the document and collateral to rotation at said predetermined speed in the reading station to be performed while one of the documents is being rotated at the predetermined speed in said reading station.

13. Document handling apparatus comprising a support, means defining a document feed station and a document discharge station, a plurality of document holding members rotatively carried by said support, means to move said support in a constraining path to bring successive members serially through said feed station and said discharge station, and means operative to accelerate the rotation of each member as it is moved by said support between said stations.

14. Sheet handling apparatus comprising a rotary support, a plurality of spaced sheet holding members rotatively carried by said support, motor means associated with each member to rotate said members as said members are processed by said support, sheet gripping means operative with each member, said gripping means being operative to adhere a sheet to a first member when said first member is in a first position at which said member rotating means for said first member rotates said first member at a low speed, said member rotating means increasing the rotational speed of said first member when the sheet is adhered thereto, and said support precessing said first member to a second predetermined position and bring a second of said members into said position formerly occupied by said first member, said second member sheet gripping means being operative to adhere a sheet to said second member after which said member rotating means for said second member accelerate the rotation of said second member, and said first and second members being precessed by said support to new positions at which said gripping means for said first member releases its sheet and said second member occupies the position of said first member immediately preceding the last mention precession.

15. Apparatus according to claim 14 wherein said accelerating means include means to render said accelerating means ineffective after said second member is precessed by said support from said second position.

16. An apparatus to handle documents at high speed where each document-handling cycle includes the successive procedures of picking up a document and discharging a document, said apparatus comprising a support means to move said support, a plurality of means connected to said support for handling documents, means to rotate said plurality of means, each of said plurality of means handling a document for a said document-handling cycle as said support is moved by said support-moving means, said plurality of means being concurrently in different positions a said document-handling cycle so that while one document is being picked up another is being scanned, and said means to rotate said plurality of means causing said plurality of means to be rotated at different speeds during a single cycle.

17. In a sheet-handling apparatus having a support, means to move said support, a plurality of sheet-holding devices movable with said support, and means associated with each device to retain a sheet thereon, the improvement comprising means for rotating said devices at different speeds during the movement of said support, said rotating means including means to rotate each device at a first speed when said support has them in one position and means to rotate each device at a second speed when said support has them in a second position, and one of said devices being rotated at said first speed while another of said devices is concurrently operated at said second speed.

References Cited by the Examiner

UNITED STATES PATENTS

| | | | |
|---|---|---|---|
| 2,792,175 | 5/57 | Amundsen | 235—61.11 |
| 2,903,260 | 9/59 | Faeber | 270—54 |
| 2,991,074 | 7/61 | Saltz | 271—29 |

MALCOLM A. MORRISON, *Primary Examiner.*

WALTER W. BURNS, DARYL W. COOK, *Examiners.*